United States Patent
Kanerva et al.

(10) Patent No.: US 6,415,410 B1
(45) Date of Patent: Jul. 2, 2002

(54) SLIDING-WINDOW DATA FLOW CONTROL USING AN ADJUSTABLE WINDOW SIZE

(75) Inventors: Mikko Kanerva, Helsinki; Hannu Kari, Veikkola; Jari Vainikka, Vantaa; Juha-Pekka Ahopelto, Helsinki, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/952,058

(22) PCT Filed: May 7, 1996

(86) PCT No.: PCT/FI96/00256

§ 371 (c)(1),
(2), (4) Date: Nov. 19, 1998

(87) PCT Pub. No.: WO96/36150

PCT Pub. Date: Nov. 14, 1996

(30) Foreign Application Priority Data

May 9, 1995 (FI) .................................................. 952255

(51) Int. Cl.[7] .............................................. H04L 1/18
(52) U.S. Cl. ....................................................... 714/749
(58) Field of Search ................................ 714/748, 749, 714/746

(56) References Cited

U.S. PATENT DOCUMENTS

| | | | |
|---|---|---|---|
| 4,677,616 A | | 6/1987 | Franklin |
| 4,736,369 A | | 4/1988 | Barzilai et al. |
| 4,769,815 A | | 9/1988 | Hinch et al. |
| 4,841,526 A | * | 6/1989 | Wilson et al. ............... 714/748 |
| 5,063,562 A | | 11/1991 | Barzilai et al. |
| 5,163,046 A | * | 11/1992 | Hahne et al. ................. 370/79 |
| 5,193,151 A | | 3/1993 | Rajendra |
| 5,590,133 A | * | 12/1996 | Billström et al. ........ 370/349 |
| 5,592,627 A | * | 1/1997 | Burt et al. ................... 709/232 |
| 5,717,689 A | * | 2/1998 | Ayanoglu ..................... 370/349 |
| 5,764,625 A | * | 6/1998 | Bournas ....................... 370/231 |
| 5,809,066 A | * | 9/1998 | Suomi et al. ................. 375/222 |
| 5,909,648 A | * | 6/1999 | Boudreaux et al. ......... 455/422 |
| 6,122,759 A | * | 9/2000 | Ayanoglu et al. ............. 714/47 |

FOREIGN PATENT DOCUMENTS

| | | | | |
|---|---|---|---|---|
| JP | 362018147 A | * | 1/1987 | ............ H04L/11/00 |
| JP | 363171042 A | * | 6/1988 | ............ H04L/13/00 |
| JP | 403080630 A | * | 8/1989 | ............ H04B/5/00 |
| JP | 404085645 A | * | 3/1992 | ............ G06F/13/12 |

OTHER PUBLICATIONS

Dynamic Computation of TCP Maximum Window Size for Directly Connected Hosts; Publication–Data: IBM Technical Disclosure Bulletin, Apr. 1994, US; vol. No. 37; Issue No. 4A; p. No. 601–608; Publication–Date Apr. 1, 1994.*

Sliding Window Flow Control for the Checkpoint Mode Protocol; Publication–Data IBM Technical Disclosure Bulletin, Jun. 1988, US; vol. No. 31; Issue No. 1; p. No. 281; Publication–Date Jun. 1, 1988.*

(List continued on next page.)

Primary Examiner—Albert Decady
Assistant Examiner—Joseph D. Torres
(74) Attorney, Agent, or Firm—Pillsbury Winthrop LLP

(57) ABSTRACT

A digital data transmission system includes a transmitting party, a receiving party, a non-transparent circuit-switched data connection between the transmitting and receiving parties, a control element for changing the data transmission capacity of the data connection, and a sliding-window data flow control protocol where the number of transmitted data frames to which the transmitting party has not received an acknowledgement from the receiving party is not allowed to exceed the size of the sliding window. The transmitting and receiving parties are arranged to change the size of the sliding window when one or both of them receive information from the control element on a change in the data transmission capacity of the data connection.

8 Claims, 3 Drawing Sheets

OTHER PUBLICATIONS

A.R. Osborn and D.W. Browning; A comparative study of flow control methods in high–speed networks; Twelfth Annual International Phoenix Conference on Computers and Communications, 1993; pp. 353–359.*

D.D. Kouvatsos and A.T. Othman; Optimal flow control of end–to–end packet–switched network with random routing; Computers and Digital Techniques, IEE Proceedings E [see also Computers and DigitalTechniques, IEE Proceedings–], vol.: 136 Issue: 2, Mar.*

K.–T. Ko, and S.K. Tripathi; Optimal end–to–end sliding window flow control in high–speed networks, Conference Proceedings Tenth Annual International Phoenix Conference on Computers and Communications, 1991; pp. 601–607.*

Draft PrETS 300 940 (GSM 04.08 version 5.6.2):Sep. 1997, pp. 53–54.

Draft prETS 300 940 (GSM 04.08 version 5.6.2): Sep. 1997, pp. 181–182.

V.110 (9/92) CCITT, Support of Data Terminal Equipments with V–Series Type Interfaces by an Integrated Services Digital Network, pp. 1–58.

V.24 (3/93) ITU–T, List of Definitions for Interchange Circuits between Data Terminal Equipment (DTE) and Data Circuit–Terminating Equipment (DCE), pp. 1–19.

Mouly et al: The GSM System for Mobile Communications, pp. 216–259, 1992.

* cited by examiner

SLIDING-WINDOW DATA FLOW CONTROL USING AN ADJUSTABLE WINDOW SIZE

This application is the national phase of international application PCT/FI96/00256 filed May 7, 1996 which designated the U.S.

FIELD OF THE INVENTION

The invention relates to sliding-window flow control using an adjustable window size on a non-transparent data connection whose nominal data transmission rate may vary during the connection.

BACKGROUND OF THE INVENTION

In non-transparent asynchronous data transmission on a circuit-switched connection, data is transmitted from a transmitting party A to a receiving party B in frames or "packets". Besides actual user data, the frames comprise both error-detecting and error-correcting bits to enable the receiving party to detect and possibly correct transmission errors. Each frame is also numbered or the order of the frames is indicated by means of another kind of identifier. The correctness of each received frame is tested at the receiving end. If the frame is found correct, the receiving party acknowledges receipt by transmitting the frame number. If a frame is not found correct (eg due to a transmission error), it will not be further processed (but is "discarded"). A negative acknowledgement (eg a retransmission request) is sent for example in case of discontinuity in frame numbering. Let us assume that a correct frame numbering is, for example 1,2,3,4,5. However, if frame 3 is followed by frame 5, frame 4 is missing and a negative acknowledgement will be sent for frame 4. Once the transmitting end receives a negative acknowledgement or no acknowledgement at all, it retransmits the frame a predetermined number of times. The total number of repetitions is limited, so that endless transmission loops are avoided in a very bad connection.

On such a connection user data throughput varies with the quality of the connection. Deterioration in the quality of the connection results in an increase in the number of incorrect and lost frames, and consequently the number of repetitions.

Moreover, the frames have to be stored (buffered) at the transmitting end until they have been acknowledged so that they are available should retransmission be needed. To limit the amount of necessary buffering, a flow control protocol based on a sliding window may be used in the acknowledgement. In accordance with the flow control protocol the transmitting party A may send a plurality of data frames before requiring acknowledgement from the receiving party. A window represents a sliding sequence of successive frames that have been sent but have not yet been acknowledged (a transmission window). The maximum number of unacknowledged frames equals window size WS. Party B is also prepared to receive WS frames in a reception window, which is a sliding sequence of successive frames that may be acceptably received. The frames that fit into said window but have not arrived in the correct order are gathered into the reception window. Let us assume that frames 1,2,5,6,7 are received. After frames 1 and 2 the window is slid forward, whereas 5, 6 and 7 are stored in the reception window where they wait for the missing frames 3 and 4. Once frames 3 and 4 arrive, the reception window is slid over 3,4,5,6 and 7. When the receiving end acknowledges one or more frames, the reception and transmission windows are slid forward a corresponding number of frames. By means of a sliding window the nominal data transmission capacity of a transmission channel may be better utilized and a higher throughput may be achieved than in a case when the transmitting end A does not send a new frame until it has received an acknowledgement of the previous frame from the receiving end.

An example of data transmission according to the above type is non-transparent asynchronous data transmission on a circuit-switched connection in the European digital mobile communication system GSM. Herein the sliding-window flow control is Radio Link Protocol RLP in accordance with the GSM specification 04.22. The maximum size of a window is 61 frames, which is also the default value at the beginning of the connection. At the beginning of the connection, by negotiation between the transmitting and receiving parties, the window size may be reduced to a lower value between 1 and 61 to avoid overflows in the transmitting or receiving buffers.

When the nominal data transmission capacity changes, usually leading to a change in the throughput, it is sometimes preferable to change window size WS so that the frame transmission policy is adapted to the new situation. Usually there is no way of knowing in advance when such a change in data transmission capacity will occur. Once the unexpected change has occurred, the transmitting and receiving parties may base their decisions regarding the new situation on eg interpretation of time supervision, requested retransmissions and Receive Not Ready (RNR) messages, as these may be different in the new situation. Such an approach where reaction takes place after a change has occurred, may lead to temporary data flow congestion or to inefficient use of transmission capacity; problems that may not be eliminated until window size WS has been readjusted to comply with the new situation.

The most significant factor limiting transmission capacity in mobile communication systems is the traffic channel at the radio interface. Eg the GSM system cannot at present support user data transmission rates higher than 9.6 kbits/s, which is the maximum user data transmission rate for one full-speed GSM traffic channel.

One solution that enables also higher user data transmission rates in mobile communication systems is disclosed in the applicant's copending Finnish Patent Applications 942190 and 945817 (unpublished on the priority date of the present application). Herein two or more parallel traffic channels (subchannels) on the radio path are allocated for one high-speed data connection. A high-speed data signal is divided into these parallel subchannels at the transmitting end for transmission over the radio path, and reassembled at the receiving end. This allows the offering of data transmission services where the transmission rate may be even eightfold, depending on the number of allocated traffic channels, compared with the transmission rate of the conventional (single-channel) transmission rate. In the GSM system, for instance, a total user data transmission rate of 19.2 kbits/s is achieved by two parallel subchannels each supporting rate-adapted 9.6 kbits/s as in the existing non-transparent 9.6 kbits/s bearer services of the GSM system.

Consequently, a non-transparent circuit-switched data connection may comprise a plurality of parallel traffic channels at the radio interface, and the number of traffic channels may vary during the connection. The above described problems with adjusting the window size as the nominal data transmission capacity changes, are especially obvious in this kind of multi-channel system where the transmission capacity may even double or increase many-fold in an instant. That is, although the nominal transmission capacity increases, the additional capacity cannot effectively be utilized, at least not without a significant delay, unless the window size is correspondingly increased as soon as possible.

DISCLOSURE OF THE INVENTION

The object of the invention is to alleviate or eliminate the above problems.

This is achieved with a digital data transmission system comprising a transmitting party, a receiving party, a non-transparent circuit-switched data connection between the transmitting and receiving parties, control means for changing the data transmission capacity of the data connection, and a sliding-window data flow control protocol where the number of transmitted data frames to which the transmitting party has not received an acknowledgement from the receiving party is not allowed to exceed the size of said sliding window, A unit in a data transmission system using sliding-window data flow control with an adjustable window size in accordance with the invention, and changing the nominal data transmission capacity (data transmission rate) of a non-transparent data connection, notifies the change to the transmitting party A or the receiving party B or both. By means of this information the receiving and transmitting parties can change the size of the sliding window in a controlled manner. Both parties A and B may adjust the window size independently, in accordance with predetermined rules, or they may start negotiating about the window size. The invention makes it possible to respond to a change in the nominal data transmission capacity simultaneously as the change takes place, and thus the problems, such as temporary congestion of data flow or inefficient utilization of capacity, associated with prior art solutions may be eliminated or alleviated. This is valid for both unidirectional and bidirectional data transmission where both parties can send and receive data.

BRIEF DESCRIPTION OF THE DRAWINGS

The invention will be described below with reference to accompanying drawing in which.

PREFERRED EMBODIMENTS OF THE PRESENT INVENTION

The present invention may be employed in all digital data transmission systems using sliding-window flow control with an adjustable window size on a non-transparent data connection whose nominal data transmission rate may vary during the connection.

The present invention is especially suited for data transmission applications in digital mobile communication systems of the TDMA or CDMA type, such as the European digital mobile communication system GSM, DCS1800 (Digital Communication System), a mobile communication system according to the EIA/TIA Interim Standard IS/41.3, etc.

Figure 1:
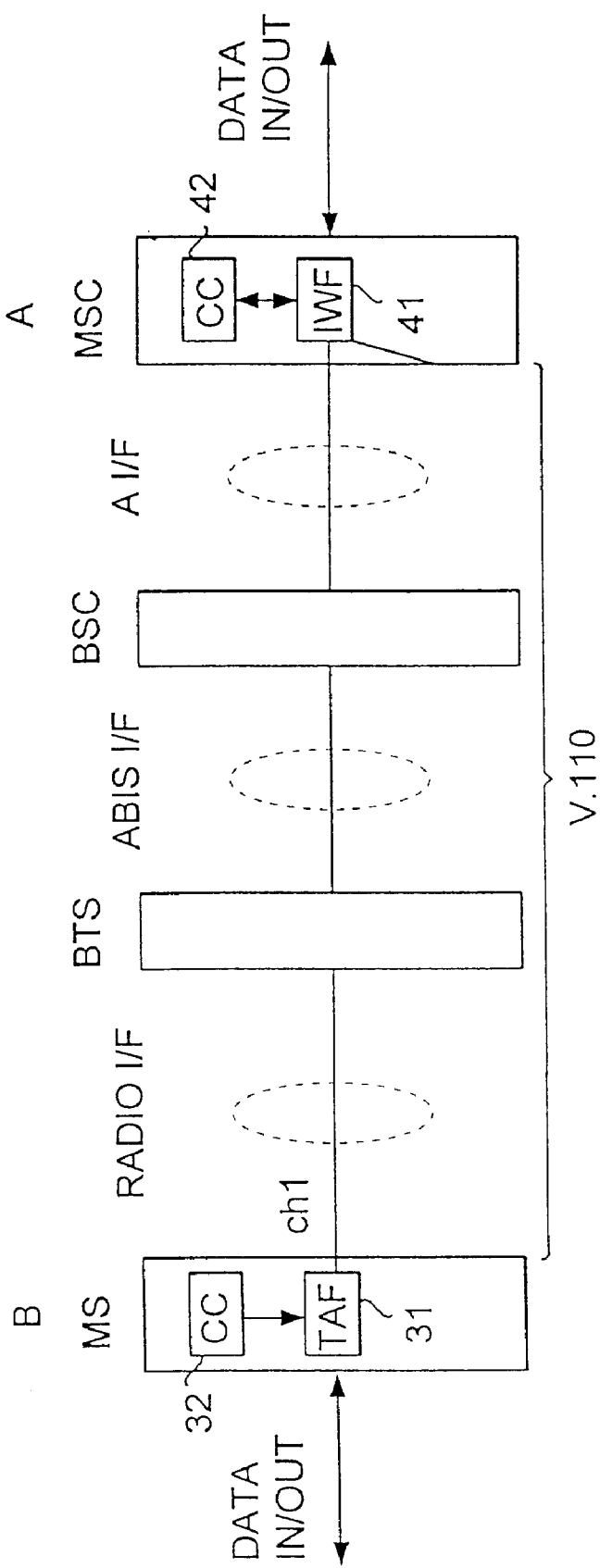
FIG. 1 illustrates a part of a mobile communication system to which the invention may be applied on a single-channel non-transparent connection.

The invention will be described below by using the GSM mobile communication system as an example without being limited to it. The basic structural parts of the GSM system are shown in FIG. 1, but in this application there is no need to describe their properties or other sections of the system in greater detail. As to a more detailed description of the GSM system, reference is made to the GSM specifications and the book "The GSM System for Mobile Communications", M. Mouly & M. Pautet, Palaiseau, France, 1992, ISBN: 2-9507190-0-7.

A mobile services switching centre MSC establishes incoming and outgoing calls. The MSC performs similar tasks as an exchange in the public switched telephone network (PSTN). Moreover, the MSC performs functions typical of mobile telephone traffic only, such as subscriber location management, in cooperation with the subscriber registers of the network (not shown). Mobile stations MS communicate with the MSC via base station systems (BSS). The base station system BSS consists of a base station controller BSC and base transceiver stations BTS.

The GSM system is a time division multiple access (TDMA) system where traffic on the radio path is time divided and occurs in successively repeating TDMA frames, each of which consists of a plurality of time slots. A short information packet is sent in each time slot as a radio frequency burst of finite duration and consisting of a group of modulated bits. Time slots are mainly used to convey control channels and traffic channels. Speech or data is transmitted on the traffic channels. Signalling between a base station and a mobile station takes place on the control channels. The channel structures used at the radio interface of the GSM system are described in more detail in the GSM specifications 05.02. In accordance with the specification, one time slot from one of the carrier waves is designated to a mobile station MS as a traffic channel (Single Slot Access) at the beginning of a call. The mobile station MS synchronizes with the time slot to transmit and receive radio frequency bursts.

In the GSM system a data connection is established between a terminal adaptation function TAF 31 of a mobile station MS and an interworking function IWF 41 (usually in connection with the mobile services switching centre MSC) in a fixed network. The data connection is a circuit-switched connection that reserves one (or more) traffic channels from the radio interface for the whole duration of the connection. In the GSM network, the data connection is a V.110 speed-adapted, to V.24 interfaces adaptable digital connection. The herein-described V.110 connection is a digital transmission channel originally designed for ISDN technology (Integrated Services Data Network) that adapts to the V.24 interface and offers a chance to transmit also V.24 statuses (control signals). The CCITT recommendation for a V.110speed-adapted connection is described in the CCITT Blue Book V.110. The CCITT recommendation for the V.24 interface is presented in the CCITT Blue Book V.24. The terminal adaptation function TAF adapts a data terminal (not shown) connected to a mobile station MS to the V.110 connection, which is established in FIG. 1 over a circuit-switched connection using one traffic channel ch1. The interworking function IWF adapts the V.110 connection to another V.110 network, such as ISDN or another GSM network, or to another transit network, such as the public switched telephone network PSTN.

Data is transmitted between the terminal adaptation function TAF and the interworking function IWF in frames or "packets" using sliding-window flow control with an adjustable window size. This sliding-window flow control is Radio Link Protocol (RLP) according to the GSM specification 04.22. Data transmission between the interworking function IWF according to the protocol will be described below under the assumption that the interworking function IWF is the transmitting party A and the terminal adaptation function TAF is the receiving party B. Is should, however, be noted that data transmission takes place similarly even in the opposite direction, TAF-IWF.

In non-transparent asynchronous data transmission on a circuit-switched connection, data is transmitted from a transmitting party A to a receiving party B in frames or "packets". Besides actual user data, the frames comprise error-detecting bits to enable the receiving party to detect transmission errors. Each frame is also numbered or the order of the frames is indicated by means of another kind of identifier. Party A stores, i.e. buffers, the transmitted frame until receipt from party B of an acknowledgement of successful receipt of the frame. Party B tests the correctness of each received frame. If the frame is found correct, the receiving party acknowledges receipt by transmitting the frame number. If the frame is not found correct (eg due to a transmission error), it will not be further processed (but is "discarded"). A negative acknowledgement (eg a retransmission request) is sent for example in case of discontinuity in frame numbering. Let us assume, for example, that a correct frame numbering is 1,2,3,4,5. However, if frame 3 is followed by frame 5, frame 4 has been left out and a negative acknowledgement will be sent for frame 4. Once party A receives a negative acknowledgement, or no acknowledgement at all, party A retransmits the frame until an acknowledgement is received or the maximum number of retransmissions is reached. The total number of repetitions is limited so that endless transmission loops are avoided in a very bad connection.

The transmitting party A may transmit a plurality of data frames and buffer them before requiring acknowledgement from the receiving party B. This sliding sequence of successive frames that have been sent but not yet acknowledged, is called a sliding transmission window. The maximum number of unacknowledged frames equals window size WS. In the same way the receiving party B is prepared to receive WS frames in a reception window, which is a sliding sequence of successive frames that can be acceptably received. The frames that fit into said window but have not arrived in the correct order are gathered into the reception window. Let us assume that frames are received in the order 1,2,5,6,7. After frames 1 and 2 the window is slid forward, whereas frames 5, 6 and 7 are stored in the reception window where they wait for the missing frames 3 and 4. Once frames 3 and 4 arrive, the reception window is slid over 3,4,5,6 and 7. When the receiving end acknowledges one or more frames, the reception and transmission windows are slid forward a corresponding number of frames. By means of a sliding window the nominal data transmission capacity of the transmission channel may be better utilized and a better throughput may be achieved than when the transmitting end A does not send a new frame until it has received an acknowledgement of the previous frame from the receiving end.

In accordance with the invention the transmitting party (IWF or TAF) changes the transmission window size WS and the receiving party B (TAF or IWF) changes the reception window size WS when the data transmission capacity on a circuit-switched connection between IWF-TAF changes. In the case of one traffic channel as shown in FIG. 1, the change of transfer channel signifies a change in the nominal transmission rate between 2400 bits/s, 4800 bits/s and 9600 bits/s. The procedure that changes the nominal data transmission capacity of the connection is not an essential part of the invention. It may be eg a Channel Mode Modify procedure according to the GSM specification 04.08 (pp. 53–54, 181–182). Typically a call control unit 42 of the mobile services switching centre MSC participates in the changing of the transmission capacity of a data connection, and signals information on the new nominal transmission capacity to a call control unit 32 of the mobile station MS. Even other functional units in the mobile station MS or the mobile services switching centre MSC may bring about or participate in the change of transmission capacity. As to the invention, it not essential which unit or function in the mobile station MS or the mobile services switching centre MSC carries out the change of the nominal transmission capacity or participates therein. As far as the invention is concerned, it is only required that one of these units or functions informs the new nominal data transmission capacity to party A, party B, or both, i.e. to IWF, TAF, or both. It is assumed in the example of FIG. 1 that the call control unit 42 informs the change in the nominal data transmission capacity to the interworking function IWF and the call control unit 32 provides the same information to the terminal adaptation function TAF. The information may be the actual nominal data transmission rate, its change, or a simple alarm.

On receiving information on a changed data transmission capacity, parties A and B may adjust their window sizes WS to correspond to the new transmission capacity either independently in accordance with predetermined rules, or they may start negotiating in order to change window size WS. Let it be assumed, for example, that a non-transparent data connection has a nominal transmission capacity of 2400 bits/s, and IWF and TAF receives information on a change in the nominal transmission capacity to the value 4800 bits/s at a certain point of time, which allows the parties A and B to change window size WS accordingly within the limits set by the mobile communication system. Such limits are, eg the buffering capacity of party B, limitations in frame numbering, etc. The window size may be eg 61 frames at data transmission rate 9600 bits/s, 32 frames at data transmission rate 4800 bits/s and 16 frames at data transmission rate 2400 bits/s. These values may be default values that IWF and TAF may change by eg negotiation according to the GSM specification 04.22.

In the example in FIG. 1, data transmission on one traffic channel was described, and therefore the highest possible user data transmission rate is limited by the capacity of the traffic channel, eg in the GSM system 9600 bits/s.

The applicant's copending Finnish Patent applications 942190 and 945817 disclose a procedure where a mobile station MS that needs higher-rate data transmission than one traffic channel can offer, is assigned two or more time slots in the same TDMA frame. The maximum user data transmission rate of a multi-channel data connection is the number of parallel traffic channels x the user data transmission rate 9600 bits/s of one traffic channel. In this way the user rate 19200 bits/s, for instance, may be supplied on two traffic channels as a minimum. This procedure is presented in this application as one example of a manner of embodying high-rate data transmission based on a plurality of parallel traffic channels in a radio system. Regarding the details of this procedure, reference is made to said patent applications. It must, however, be noted that as to the invention, the only essential requirement is that it is possible to establish a multi-channel transmission connection, and the invention is solely directed at the adjustment of the window size when the transfer capacity of such a multi-channel connection is changed by increasing or decreasing the number of traffic channels.

Figure 2:
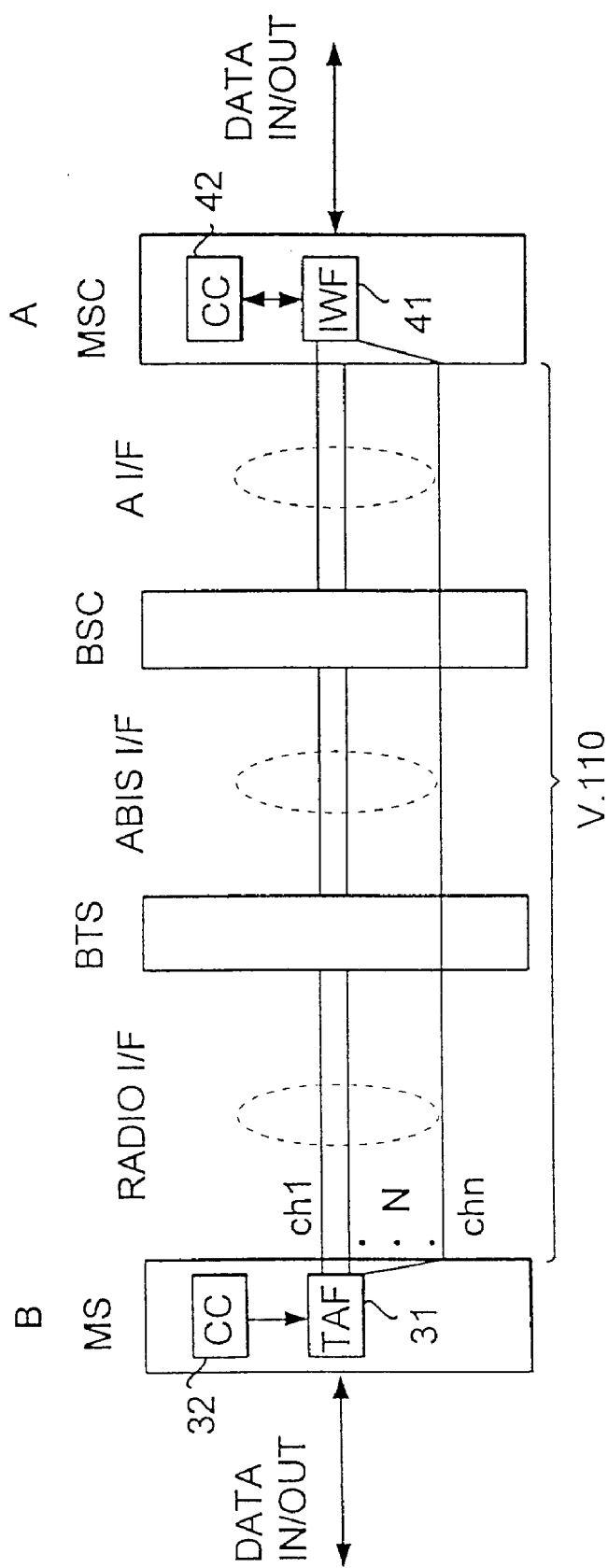
FIG. 2 illustrates a part of a mobile communication system to which the invention may be applied on a multi-channel non-transparent connection.

FIG. 2 illustrates the architecture of the GSM network that realizes a telefax service of such a group using multiple parallel traffic channels. FIG. 2 is identical to FIG. 1 except that in FIG. 2 a circuit-switched non-transparent connection comprising N parallel traffic channels ch1-chn, where N=1, 2, . . . , exists between the terminal adaptation function TAF and the interworking function IWF. In a mobile station the network termination 31 operates as a divider that divides a high-rate data signal DATA IN received from data terminal equipment into parallel traffic channels ch1-chn, and as a combiner that combines low-rate partial signals received from parallel traffic channels ch1-chn into a high-rate data signal DATA OUT. Correspondingly, at the other end of a multi-channel data connection, the interworking function IWF functions as a divider that divides an incoming high-rate data signal DATA IN into parallel traffic channels ch1-chn, and as a combiner that combines low-rate partial signals received from parallel traffic channels ch1-chn into a high-rate data signal DATA OUT.

On a multi-channel data connection it is especially advantageous to be able to change window size WS simultaneously as the nominal transmission capacity changes, in order to utilize the available transmission capacity as efficiently as possible and avoid congestion. Changing the nominal transmission capacity may involve changing the number of radio channels allocated to the connection or changing the nominal transmission rate of one or more traffic channels. Changing the nominal transmission rate of individual traffic channels takes place as in the above case of one traffic channel in FIG. 1.

Figure 3:
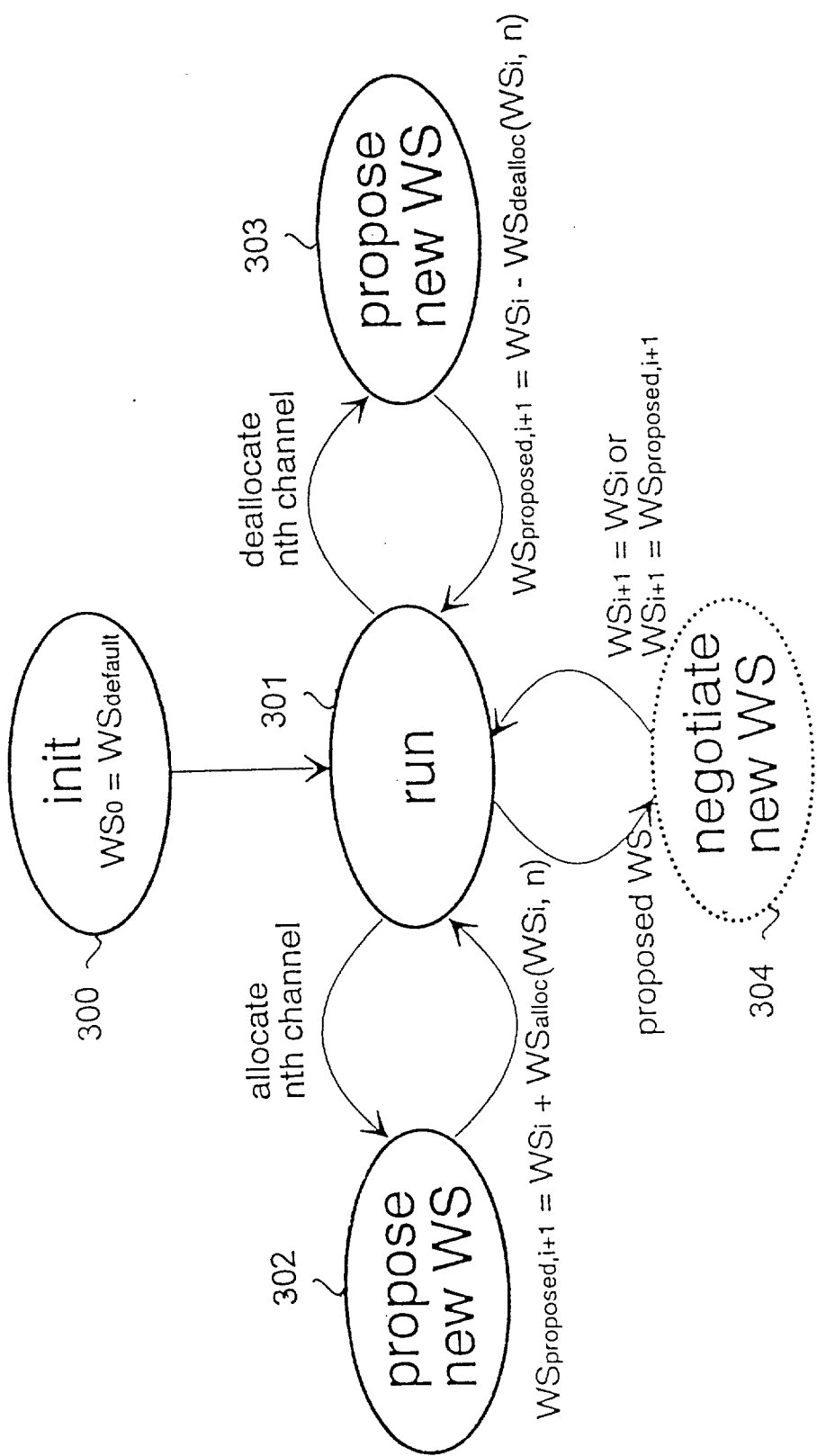
FIG. 3 is a state diagram illustrating a manner of changing the window size when the number of traffic channels on a multi-channel data connection is increased or decreased.

The diagram in FIG. 3 illustrates a manner of changing the window size when the number of traffic channels on a multi-channel data connection is increased or decreased. In the following the adjustment of the window size in the interworking function IWF of FIG. 2 will be described. The adjustment procedure is similar in the terminal adaptation function TAF.

At the beginning of the connection, when the network adapter is in an initial state 300, init, the initial value of window size $WS_0$ is given a default value $WS_{default}$. The default value $WS_{default}$ is dependent on the number of traffic channels, eg $WS_{default}=61$ when N=1.

In state 301, run, IWF performs a data transmission routine using the given window size.

On receiving information on the allocation of a new traffic channel to the radio path for the data connection, IWF moves to state 302, propose new WS. In state 302 IWF proposes a new window size $WS_{proposed,i+1}$, where the window size is increased by the value $WS_{alloc}$, which is dependent on both the number of new traffic channels N and the present window size $WS_i$. IWF then returns to state 301.

On receiving information of the deallocation of a traffic channel used by the data connection on the radio path, IWF moves to state 303, propose new WS. In state 303 IWF proposes a new window size $WS_{proposed,i+1}$, where the window size is increased by the value $WS_{dealloc}$, which is dependent on both the number of new traffic channels N and the present window size $WS_i$. IWF then returns to state 301.

Having returned from state 302 or 303 to state 301, IWF either sets $WS_{i+1}=WS_{proposed,i+1}$ as the new window size without negotiating with the terminal adaptation function TAF or starts negotiating with the terminal adaptation function TAF. The negotiation is voluntary or unnecessary when both parties to the connection may be assumed to get information on the change in the number of channels almost simultaneously, in which case they may set the window size independently to the same value.

In case of no negotiation, IWF continues data transmission in state 302 using the new window size $WS_{i+1}=W_{proposed,i+1}$.

In case negotiation takes place, IWF moves to state 304. In state 304 IWF negotiates with TAF about the window size, eg following the GSM specification 04.22. As a result of the negotiation the window size either remains unchanged, $WS_{i+1}=WS_i$, or a new window size is set in accordance with the proposal, $WS_{i+1}=WS_{proposed,i+1}$ or $WS_{i+1}>$ the proposal of the opposite party. IWF then returns to state 301.

Having returned from state 304 to state 301 IWF continues data transmission using window size $WS_{i+1}$.

It must be noted that the increase in the window size that IWF chooses in state 302 when a new traffic channel is allocated is not necessarily of the same size as the decrease in the window size that IWF chooses in state 303 when the same traffic channel is deallocated.

In accordance with the diagram shown in FIG. 3, several traffic channels may be allocated or deallocated simultaneously. This may take place for instance by performing the change operations of states 302 or 303 several times, one traffic channel at a time, or by performing the change in window size corresponding to the whole change in the number of channels by one operation of states 302 or 303. In this case the change in window size is not necessarily the sum of changes in individual channels.

Traffic channels are typically allocated and deallocated, i.e. added to or removed from a data connection, by the mobile services switching centre MSC, preferably its call control unit 42, which then signals the information on the allocated traffic channels to the mobile station MS, preferably to its call control 32. From the point of view of the invention, the procedure for allocating traffic channels to a data connection, or the unit or function participating in the allocation, is not essential. As far as the invention is concerned, it is only essential that a unit or function participating in the allocation of traffic channels in a multi-channel connection or in the changing of the nominal data transmission rate, transmits information on the change to the interworking function IWF or to the terminal adaptation function TAF or to both. In the example shown in FIG. 2, the call control unit 42 transmits information on the changed nominal transmission capacity to IWF and the call control unit 32 to TAF.

Even though the invention has been explained with reference to certain embodiments, it will be understood that the description is intended for an example only and changes and modifications may be made to the presented embodiments without departing from the spirit and scope of the invention set forth in the appended claims.

What is claimed is:

1. Digital data transmission system comprising:
    a transmitting party;
    a receiving party;
    a non-transparent circuit-switched data connection between the transmitting and receiving parties;
        control means for changing the data transmission capacity of the data connection; and
        a sliding-window data flow control protocol where the number of transmitted data frames to which the transmitting party has not received an acknowledgement from the receiving party is not allowed to exceed the size of said sliding window, the transmitting and receiving parties being arranged to change the size of said sliding window in response to receipt, subsequent to data transmission on at least one traffic channel, by one or both of them of information from said control means regarding a change in the data transmission capacity of the data connection.

2. System as claimed in claim 1, wherein the transmitting party and the receiving party are arranged to change the window size independently, in accordance with predetermined rules, without mutual negotiation.

3. System as claimed in claim 1, wherein the transmitting party and the receiving party are arranged to change the window size by mutual negotiation.

4. System as claimed in claim 1, 2 or 3, wherein the data transmission system is a multiple access mobile communication system where a data connection comprises one traffic channel on the radio path, and wherein changing the data transmission capacity of the data connection involves changing the data transmission rate on the traffic channel, and wherein the change in window size is dependent on the data transmission rate.

5. System as claimed in claim 1, 2 or 3, wherein the data transmission system is a multiple access mobile communication system where a data connection comprises one traffic channel or a plurality of traffic channels on the radio path, and wherein changing the data transmission capacity of the data connection involves changing the number of traffic channels allocated to the data connection, and wherein the change in window size is dependent on the number of said traffic channels.

6. System as claimed in claim 5, wherein the transmitting party is a terminal adaptation function and the receiving party is an interworking function.

7. System as claimed in claim 5, wherein the transmitting party is an interworking function in a mobile communication network and the receiving party is a terminal adaptation function in a mobile station.

8. System as claimed in claim 5, wherein said control means comprise a mobile services switching center.

* * * * *